April 25, 1939.         R. H. ZINKIL         2,155,698
FLOAT OPERATED SUPPLY VALVE
Filed Feb. 7, 1935         2 Sheets-Sheet 1
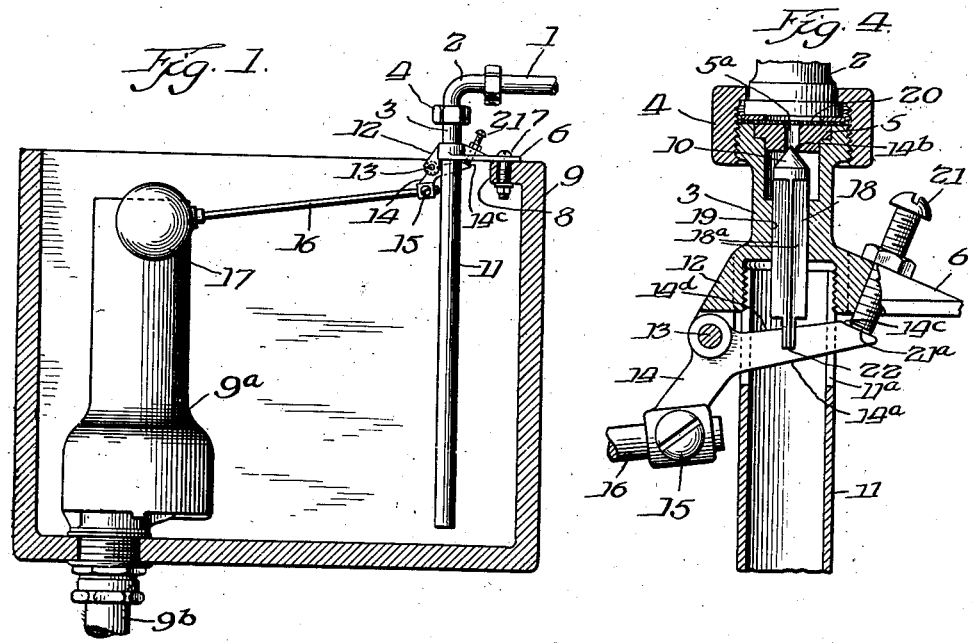
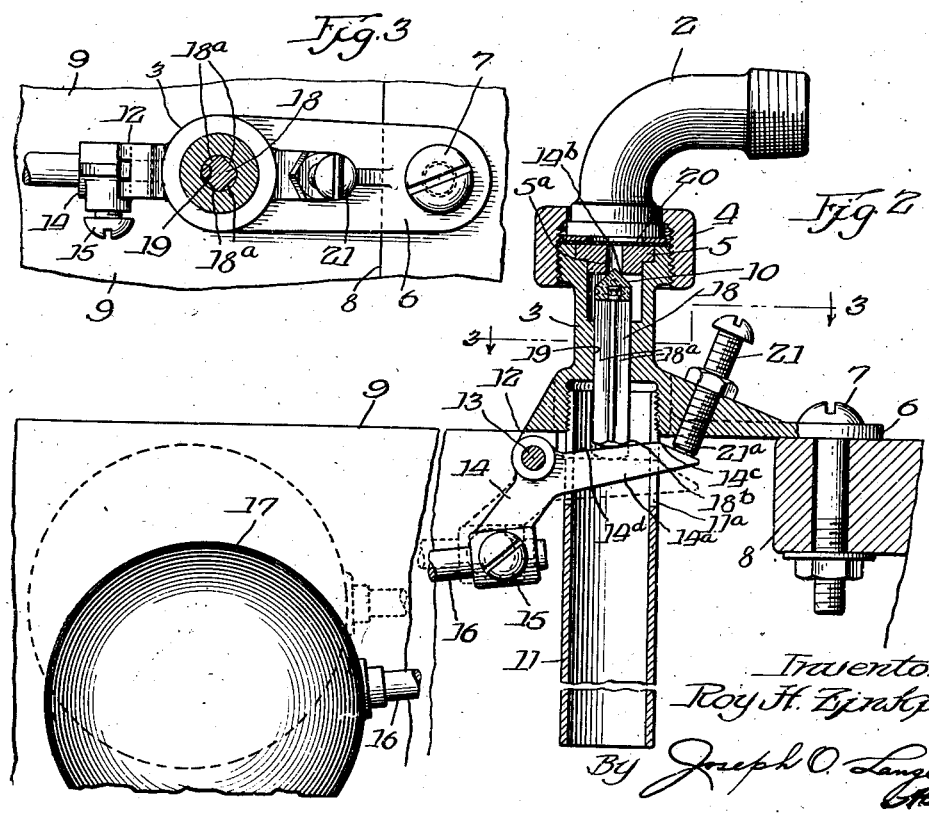
Inventor:
Roy H. Zinkil
By Joseph O. Lange

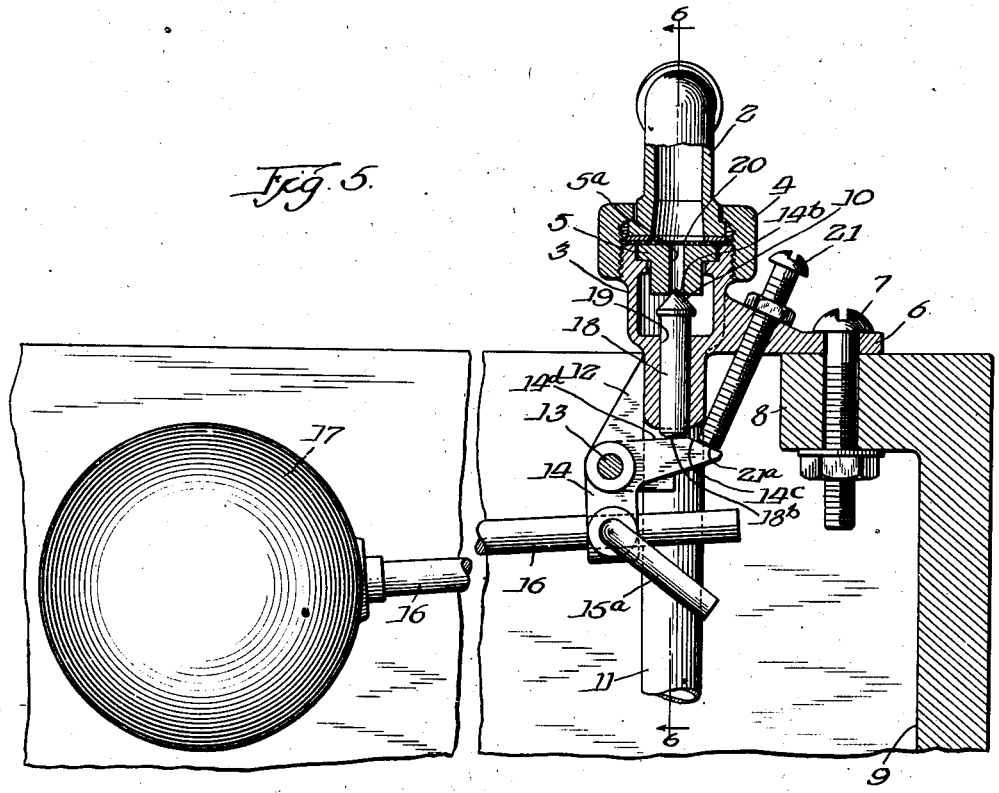

Patented Apr. 25, 1939

2,155,698

UNITED STATES PATENT OFFICE 2,155,698

FLOAT OPERATED SUPPLY VALVE

Roy H. Zinkil, Oak Park, Ill., assignor to Crane Co., Chicago, Ill., a corporation of Illinois Application February 7, 1935, Serial No. 5,356

10 Claims. (Cl. 251—130)

This invention pertains to valves, and more particularly it applies to a float operated valve ordinarily used in connection with a tank supply for use with plumbing fixtures in which automatic flushing is desirable, as for example, with urinal tanks and the like.

In the flushing of certain of the plumbing fixtures referred to, frequently some means must be provided for automatically filling a supply container such as a flush tank within a certain time interval, depending upon the conditions of installation, which vary with the volume and frequency of the flush desired.

It is the principal purpose of this invention to provide a valve supply means in which a constant timing is maintained for each filling cycle, the latter being determined by the period elapsing between the filling of the tank and the subsequent discharge of its contents at a predetermined water level therewithin. The constant timing referred to is accomplished by avoiding the erosion of the fluid controlling passages by providing extremely hard material for the control orifice and valve members as well as to enlarge the space between the valve and orifice control member, thereby discharging any accumulation of solid matter that ordinarily tends to collect in a restricted liquid flow passage at a time in each cycle, as for example, when the tank contents are discharged. In the absence of such an increased volume periodically past the valve member, foreign matter might otherwise be permitted to deposit and thus objectionably restrict the flow of water to the tank being filled and in so doing obviously change the timing or even result in stoppage or cause excessive wire drawing. Of course, for sanitary reasons the timing of the discharge of flushing tanks must be certain and positive in its regularity and frequency of operation.

An object of this invention is to provide for a valve in which the accurate control of the flush supply means can be taken care of, and at the same time, even with very limited opening of the supply inlet, an accurate flush can be accomplished without wire drawing, eroding or cutting of the valve or otherwise objectionably affecting the inlet valve seat.

An important object is to provide in an inlet supply valve a positive means for flushing of sediment from the seat each time the main discharge valve of the container or tank discharges the water to the fixture in the operation of flushing it.

An important object is to provide for an inlet supply valve which will allow for relatively slow filling of the tank so the periodic flushing discharges will occur at preferably long intervals.

An important object is to provide for finely adjustable means for regulating the position of the valve inlet member with respect to the control orifice and thereby regulate accurately the flow of water to the tank, allowing for variable periods of filling time to suit the installation.

Another object is to provide in a valve for a positive movement of the inlet disc or valve member immediately subsequent to the time the tank is ready to discharge to the fixture. This provision prevents foreign matter and sedimentary deposits, as for example, lime, chlorine, and other materials used in water treatment to accumulate at the seat, and thereupon cause subsequent stoppage or reduced flow.

Another equally important object is to provide for an automatically actuated inlet control valve which will replace the usual ground key cock or compression stop, and which has no means for regularly opening automatically and blowing out or washing away the sedimentary deposits that ordinarily accumulate at the relatively small annular flow passage which regulates the rate of flow of water from the inlet supply source into the tank for flushing of the fixture.

Other important objects and advantages will be apparent upon the reading of the specification followed in connection with the drawings, in which:

Fig. 1 is an assembly view showing the inlet supply valve in combination with a conventional discharge valve and assembled with relation to a supply tank or container leading to a fixture to be flushed.

Fig. 2 is an enlarged fragmentary sectional view in side elevation of the inlet supply valve embodying the features of my invention.

Fig. 3 is a partial sectional view taken on line 3—3 of Fig. 2.

Fig. 4 is a fragmentary sectional view showing a modification of the valve featuring another embodiment of my invention.

Fig. 5 is a fragmentary sectional assembly view in side elevation showing another form of my invention.

Fig. 6 is a sectional view taken on line 6—6 of Fig. 5.

Like reference characters refer to similar parts in the various views.

Directing attention to Fig. 1, the numeral 1 indicates an inlet supply pipe leading to the usual water supply and which is connected by means of the union elbow 2 to the inlet supply valve 3 by the union ring 4, the valve body or casing 3 preferably having at its inlet a renewable orifice member 5 as shown more clearly in Fig. 2. The body or casing 3 is preferably mounted by means of the bracket arm 6 and the cap screws 7 upon the upper face of the rim or flange 8 of the tank 9 and is threadedly or otherwise connected to the hush tube 11 within the tank. As shown in Fig. 1, a main discharge valve 9a is preferably positioned within the tank so as to periodically allow for the discharge of water for flushing purposes through the tubing 9b leading to the plumbing fixture (not shown). The operation of the valve 9a is predicated upon the rise of the water within the tank. The valve casing 3 is further provided with a drilled lug 12 in which a pin 13 is used to pivot the actuating link lever 14 which by means of the set screw 15 is suitably attached to the float arm 16 from which latter member the ball float 17 is carried.

Directing attention to Fig. 2, showing more clearly the interior construction of the valve casing 3, the valve member 10 is embodied in one form with its guide 18 within the discharge or downstream flow of square cross-section, and further providing for the ports 18a (also see Fig. 3) through which the supply fluid passes within the seat bore 19 of the casing 3, after passing through a strainer 20.

As shown in Fig. 2 per the solid lines, the ball float 17 normally rests in a lower position by its own weight upon the float arm 16, thus causing the pivoted link lever 14 at 14c to contact at 21a with the set screw 21. The adjusting set screw 21 is preferably positioned exteriorly with respect to the tank or the casing, so that it is easily accessible without necessity for cramped positioning for adjustment within the interior portion of the tank or within the casing. Thus a fine adjustment is readily obtainable by means of an ordinary screwdriver so as to easily and conveniently regulate the rate of inlet flow past the valve member 10 during the filling of the tank. As the float 17 rises within the tank 9, due to the rise in level of the water in the tank, the lever 14 takes the position shown in dotted lines, breaking the contact at 21a, receding downwardly as indicated. The disc or valve member 10 resting upon the lever surface 14d likewise follows downwardly, which movement occurs gradually.

Obviously such receding movement of the valve member causes increased flow of liquid past the valve member, serving thereby to literally sweep away sediment accumulating during the relatively long period of reduced inlet flow occasioned by the previous raised position of the lever as shown in solid lines.

The link lever 14 is adjustable with respect to the lower end 18b of the guide 18 so that the latter normally rests upon the surface 14d by reason of its own weight as well as the liquid pressure at the inlet. It is thus apparent that by virtue of the valve member resting upon the surface 14d, a slight annular clearance or space 14b will be formed at the seat opening 5a between the valve member 10 and the orifice member 5. The annular clearance 14b obviously depends upon the position of the link lever 14 and its supporting surface 14d. Thus the angularity of the position of the surface 14d with respect to the horizontal plane is adjusted by the set screw 21 which at its lower end 21a serves as a stop for the shoulder 14c and thus limits the arcuate movement of the lever 14 upward as it pivots at 13. Accordingly, the flow passage or clearance 14b between the orifice member 5 and the valve member 10 is accurately determined.

Because of the relatively small clearance at 14b, and the consequent liability of erosion or wire drawing at the orifice and the valve, the valve member 10 may be made of a fired ceramic composition, or glass, or similar hard material, for the purpose of better withstanding the severe condition of wire drawing which ordinarily might follow when the valve is very finely adjusted for the uniform rate of flow into the tank. Obviously, the orifice member 5 may likewise be made of a specially adaptable material.

In this connection, the discovery has been made in considering the conditions above referred to, that a particular type of steatite ceramic material is especially useful for this service.

More specifically, it has been found that very desirable results are obtained when the valve member or the orifice, either or both, are made of a steatite ceramic material which resists the erosion or wire drawing effect produced by the relatively very small annular space normally extant between the valve member and the orifice. It has been found, for example, that a steatite ceramic material having a specific gravity of approximately 2½ and a hardness of about 9 Moh scale, with a crushing strength ranging between 80,000 and 120,000 pounds per square inch and a tensile strength between 1,800 and 3,000 pounds per square inch, constitutes a material which tests have indicated to be eminently satisfactory.

Obviously, a determining factor in the selection of such material has been its extreme hardness and resistance to erosion, and therefore, the example cited is only illustrative of one type of material, preferably non-metallic in its nature, which has been found satisfactory. Of course, an extremely hard, erosion-resisting metal might possibly be used.

To my knowledge, however, no one heretofore has ever used a non-metallic material for this specific class of service, and it therefore is believed to contribute as a significant element of my invention, being a material normally harder than any commercially practical metals and serving far more satisfactorily than the latter.

The annular clearance 14b thus functions to regulate the rate of inflow of water through the valve casing 3 from the supply elbow 2. It is evident that depending upon such elements as the size of the tank to be used, the character of the installation, and the frequency of flush desired, the adjustment by the screw 21 can be made to suit, so that with a larger annular opening at 14b, greater volume of inflow will be permitted and accordingly the tank will fill within a shorter period of time and affecting the filling cycle accordingly.

It will be further apparent that the discharge or hush tube 11 is preferably slotted as at 11a to allow for the arcuate movement of the lever 14 when actuated by the rising of the float 17 and the float arm 16. The water entering past the inlet annular clearance 14b discharges downwardly through the ports 18a and past the arm 14a of the lever 14 into the tank 9. As shown in Fig. 1, the hush tube may extend to within a few inches of the bottom of the tank, for in making the construction in this manner, more quiet operation is assured during the filling of the tank.

Directing attention to Fig. 4, a modified form of construction is illustrated in which the valve member 10 is of the same general type as described in Fig. 2, except that instead of resting flatly upon the rod lever upper surface 14a, the guide 18 is provided at its lower end with a bifurcated guide construction as shown at 22, straddling the lever 14a and resting upon the upper surface 14d.

Fig. 5 shows a further embodiment of my invention involving another type of the valve member 10, in which the lower guiding portion 18 thereof is cylindrical in form thus making a journalled contact or bearing within the casing bore 19. As indicated, the valve member in this modification in its normal position is also slightly away from its seat so as to likewise permit a moderated flow of water past the valve member. However, because of the closely journalled proportions previously mentioned as existing between the cylindrical periphery 18a and the bore 19 of the casing, the water from the inlet passing through the inlet clearance 14b cannot as a practical matter pass below the valve member. For this reason, it is preferable that provision be made to permit the flushing water to pass otherwise into the tank below. Therefore, as shown more clearly in Fig. 6, the rear portion of the casing 3 is provided with a back outlet 3a which permits the water to pass downwardly into the hush tube 11 suspended preferably below the passage 3a. Obviously, because the lever 14 may operate independently of the hush tube, it is not necessary to provide the latter in this modification with the slot 11a as shown in Figs. 1, 2 and 4, and further, in place of the set screw 15 as shown in Figs. 1, 2 and 4, a hooked set screw 15a may be used instead to make the adjustment between the float arm 16 and the lever 14.

From the disclosure of the various forms illustrated, it is evident that my invention is capable of numerous modifications without departing from the spirit of the invention. I desire therefore to be limited only to the extent of the claims appended hereto;

I claim:

1. In a supply control for liquid containers, comprising in combination a tank, a valve casing having an inlet and outlet, a valve member disposed below the said inlet, the said valve member being normally adjusted to permit a restricted liquid passage past the said valve member; a guide for the said valve member, the said guide forming a substantial line bearing contact within the said casing, a lever for actuating the said valve member, the said lever actuating means providing for increased liquid passage past said valve and its guide upon said lever reaching a predetermined position.

2. In a supply control for liquid containers, comprising in combination a tank, a valve casing having an inlet and outlet, a valve member disposed below the said inlet, a lever therefor, the said valve member being normally adjusted to permit a restricted liquid passage past the said valve member, a journalled guide for the said valve member, the said guide providing for a liquid passage at its periphery between the said inlet and outlet of the casing, the said valve actuating means providing for increased liquid passage past said valve member upon said lever reaching a predetermined position.

3. In a supply control for liquid containers, comprising in combination a tank, a valve casing having an inlet and an outlet, a valve member disposed below the said inlet, the said valve member being normally adjusted to permit a restricted liquid passage past the said valve member, a journalled guide for the said valve member, the said guide being of polygonal cross-section and providing for a liquid passage past its periphery between the said inlet and outlet, a lever actuating the said valve member and providing for increased liquid passage past the said valve seat and guide upon the said lever reaching a predetermined position.

4. In a supply control for liquid containers, comprising in combination a tank, a valve casing, a valve member disposed below the inlet of said casing, the said valve member being normally adjusted to permit restricted liquid passage past the said valve member, threaded adjusting means exteriorly positioned for accomplishing said adjustability, a lever actuating said valve member and providing for increased liquid passage past said valve member upon said lever reaching a predetermined position.

5. In a supply control for liquid containers, comprising in combination a tank, a casing having an inlet and an outlet, a valve member disposed below said inlet, the latter being normally adjusted to permit restricted fluid passage past the said valve, a lever actuating said valve, bifurcated guide means between said valve member and said lever, the said lever providing for increased liquid discharge past the said valve upon said lever reaching a predetermined position based upon rise of liquid within said tank.

6. In a supply control for liquid containers, comprising in combination a tank, a valve casing, a valve member disposed within said casing, the said valve member being normally adjusted to permit restricted liquid passage past the said valve, the said valve member being constructed of a substantially hard material suitable for said restricted liquid passage without erosion, a pivotal lever for actuating and supporting the said valve, whereby upon said lever reaching a predetermined position increased liquid discharge past said valve is obtained.

7. In a supply control for liquid containers, comprising in combination a tank, a valve casing having an inlet and an outlet, a valve member disposed below said inlet, the said valve member being normally adjusted and guided to permit restricted liquid passage past the said valve member, the latter having a fluted guide below said inlet constituting a liquid passage into said outlet, pivotal lever means actuating said valve member and providing for increased liquid discharge past said valve member upon reaching a predetermined position within said tank.

8. In a supply control for liquid containers, comprising in combination a tank, a valve casing having an inlet and an outlet, a valve member disposed below said inlet, the said valve member being normally adjusted to permit restricted liquid passage past the said valve member, the latter having a guide below said inlet extending into said outlet permitting liquid passage from said inlet into said outlet, a lever within said tank actuating said valve member and providing for increased liquid discharge past said guide when the water level reaches a predetermined position within said tank.

9. In a supply control for liquid containers, comprising in combination a tank, a valve casing, a valve member disposed below the inlet of the said casing, stop means for limiting the movement of the said valve member, the said valve member being normally adjusted by said stop means to permit restricted liquid passage past the said valve member, the said valve member being journalled within said casing, lever means for the said valve member, the said lever means providing for increased liquid passage within the said inlet upon said lever means reaching a predetermined position, a hush tube extending downwardly from said casing, parallel to but axially displaced from said journalled bearing within the said casing.

10. In a supply control for liquid containers, comprising in combination a tank, a valve casing having an inlet and outlet, the axis of the said outlet being displaced from the axis of said inlet, a valve member positioned within said casing, the said valve member being normally adjustable to permit restricted leakage past the said valve, journalled guide means for said valve member below the said inlet, the said valve adjusting means being positioned exteriorly of said casing, a lever actuating said valve member and providing for increased liquid passage between the said valve and the said inlet upon said lever reaching a predetermined position.

ROY H. ZINKIL.